(12) United States Patent
Suzuki

(10) Patent No.: US 7,788,454 B2
(45) Date of Patent: Aug. 31, 2010

(54) CONTROLLER INCLUDING ELECTRICALLY REWRITABLE NONVOLATILE MEMORY

(75) Inventor: Takayuki Suzuki, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 59 days.

(21) Appl. No.: 11/109,452

(22) Filed: Apr. 19, 2005

(65) Prior Publication Data
US 2005/0240719 A1 Oct. 27, 2005

(30) Foreign Application Priority Data
Apr. 22, 2004 (JP) .............................. 2004-126940

(51) Int. Cl.
G06F 12/00 (2006.01)
G06F 13/00 (2006.01)
G06F 13/28 (2006.01)

(52) U.S. Cl. ................... 711/154; 711/103; 711/114

(58) Field of Classification Search ................ 711/103, 711/154, 114
See application file for complete search history.

(56) References Cited

U.S. PATENT DOCUMENTS

| | | | | |
|---|---|---|---|---|
| 6,144,976 A * | 11/2000 | Silva et al. | ................. | 708/100 |
| 6,496,915 B1 * | 12/2002 | Halleck | ................. | 711/171 |
| 6,584,540 B1 * | 6/2003 | Shinmori | ................. | 711/103 |
| 6,601,131 B2 | 7/2003 | Sezaki et al. | | |
| 6,651,152 B1 * | 11/2003 | Ueki et al. | ................. | 711/166 |
| 7,072,232 B2 * | 7/2006 | Shiota et al. | ................. | 365/191 |
| 7,254,667 B2 * | 8/2007 | Tran et al. | ................. | 711/100 |
| 7,698,538 B2 | 4/2010 | Yoon | | |
| 2003/0145153 A1 * | 7/2003 | Avraham | ................. | 711/103 |
| 2004/0064606 A1 * | 4/2004 | Kimura | ................. | 710/56 |
| 2005/0045726 A1 * | 3/2005 | Terlizzi | ................. | 235/454 |
| 2005/0086433 A1 * | 4/2005 | Okaue et al. | ................. | 711/115 |
| 2005/0231365 A1 * | 10/2005 | Tester et al. | ................. | 340/568.1 |

FOREIGN PATENT DOCUMENTS

| | | |
|---|---|---|
| JP | 05-020050 | 1/1993 |
| JP | 05-081012 | 4/1993 |
| JP | 07-122084 | 5/1995 |
| JP | 2000-276347 | 10/2000 |

OTHER PUBLICATIONS

Japanese Office Action dated Apr. 27, 2010.

* cited by examiner

Primary Examiner—Sheng-Jen Tsai
(74) Attorney, Agent, or Firm—Occhiuti Rohlicek & Tsao LLP

(57) ABSTRACT

A controller includes an internal flash ROM to which initial data is writable after the controller is manufactured. In response to a download enable signal, a download control circuit reads data from an external serial flash ROM in accordance with a set of data read commands stored in a first command register and an address that is registered in an address register. Then, the download control circuit temporarily stores the read data in a data register. The download control circuit writes the data that is temporarily stored in the data register to the internal flash ROM by referring to a set of data write commands stored in a second command register and the address that is registered in the address register.

12 Claims, 3 Drawing Sheets

CONTROLLER INCLUDING ELECTRICALLY REWRITABLE NONVOLATILE MEMORY

CROSS-REFERENCE TO RELATED APPLICATIONS

This application is based upon and claims the benefit of priority from prior Japanese Patent Application No. 2004-126940, filed on Apr. 22, 2004, the entire contents of which are incorporated herein by reference.

BACKGROUND OF THE INVENTION

The present invention relates to a controller, and more particularly, to an electronic device controller including an electrically rewritable nonvolatile memory.

A peripheral device, such as an optical disc drive, typically includes a ROM that stores an operation program. A microcomputer (CPU) uses the operation program to control various circuits included in the peripheral device. In recent years, a flash ROM, which is electrically rewritable, is typically used as a ROM for storing such programs. The use of a flash ROM enables the operation program stored in the ROM to be updated when debugging is performed during development of the peripheral device or when update (version upgrade) is required to improve the function of the peripheral device.

Two types of programs are written to the flash ROM. The first type is the above operation program used by the CPU to control each circuit. The second type is an update program used to update the operation program. When the peripheral device is operating normally, the CPU controls circuits in accordance with the operation program written to the flash ROM. When an operation program requires updating, the CPU operates in accordance with an update program written to the flash ROM to rewrite the operation program stored in the flash ROM.

The above describes how the flash ROM functions when the operation and update programs have already been written to the flash ROM. In an initial state, however, no data is written to the flash ROM. More specifically, there is no update program written to the flash ROM in the initial state even though at least the update program must be written to the flash ROM to enable the CPU to write the operation program to the flash ROM.

Thus, a peripheral device maker has a flash ROM maker write initial data, which includes at least the update program, to a flash ROM or uses a ROM writer to write initial data to a flash ROM. The chip of the flash ROM to which the initial data has been written is then soldered to a printed circuit board of the peripheral device. Japanese Laid-Open Patent Publication No. 5-81012 describes a conventional method of rewriting a firmware.

In the flash ROM chip of the prior art, the operation for writing initial data to the flash ROM must be performed before the chip is mounted on the printed circuit board of the peripheral device. This complicates the manufacturing processes of the peripheral device and increases the manufacturing cost of the peripheral device.

Accordingly, in another prior art, a flash ROM to which no data has been written is mounted on a printed circuit board of a peripheral device before an operation program is written to the flash ROM. More specifically, the peripheral device incorporates a mask ROM storing at least an update program. The mask ROM is connected to a CPU. The CPU operates in accordance with the update program stored in the mask ROM. The CPU receives an operation program from an external host computer via an interface, such as an advanced technology attachment (ATA), advanced technology attachment packet interface (ATAPI), and small computer system interface (SCSI). Then, the CPU writes the received operation program to the flash ROM.

However, the mask ROM storing at least the update program is not used during normal operation of the peripheral device. The mask ROM, which is unnecessary during normal operation, increases the chip area of a controller (an integrated circuit for control). Further, this configuration requires the external host computer to provide the initial data. Thus, the cost for writing initial data cannot be reduced.

SUMMARY OF THE INVENTION

It is an object of the present invention to provide a controller that writes a CPU operation program to an electrically rewritable internal nonvolatile memory while preventing the circuit area from being enlarged and the manufacturing cost from being increased.

One aspect of the present invention is a controller connectable to an external nonvolatile memory. The controller includes a microcomputer provided with a sleep mode. An electrically rewritable internal nonvolatile memory stores an operation program executed by the microcomputer to control a predetermined operation. An internal interface controls input to the internal nonvolatile memory and output from the internal nonvolatile memory. An external interface controls input to the external nonvolatile memory and output from the external nonvolatile memory. A download circuit is connected between the external interface and the internal interface. The download circuit reads data stored in the external nonvolatile memory in a predetermined address unit via the external interface and writes the data to the internal nonvolatile memory in the predetermined address unit via the internal interface, in accordance with an external signal. When the download circuit is performing reading and writing of the data, the microcomputer enters the sleep mode and the internal interface disconnects the microcomputer from the internal nonvolatile memory.

Another aspect of the present invention is a controller connectable to an external nonvolatile memory. The controller includes a microcomputer provided with a sleep mode, an electrically rewritable internal nonvolatile memory for storing an operation program of the microcomputer, an internal interface connected between the internal nonvolatile memory and the microcomputer, an external interface to which the external nonvolatile memory is connected, and a download circuit connected between the external interface and the internal interface for downloading data stored in the external nonvolatile memory in accordance with an external signal. Said downloading includes alternately reading the data from the external nonvolatile memory in address units and writing the read data to the internal nonvolatile memory in the address units. The microcomputer is continuously in the sleep mode and the internal interface continuously disconnects the microcomputer from the internal nonvolatile memory during the period in which the download circuit is downloading the data.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A controller according to a preferred embodiment of the present invention will now be described.

Figure 1:
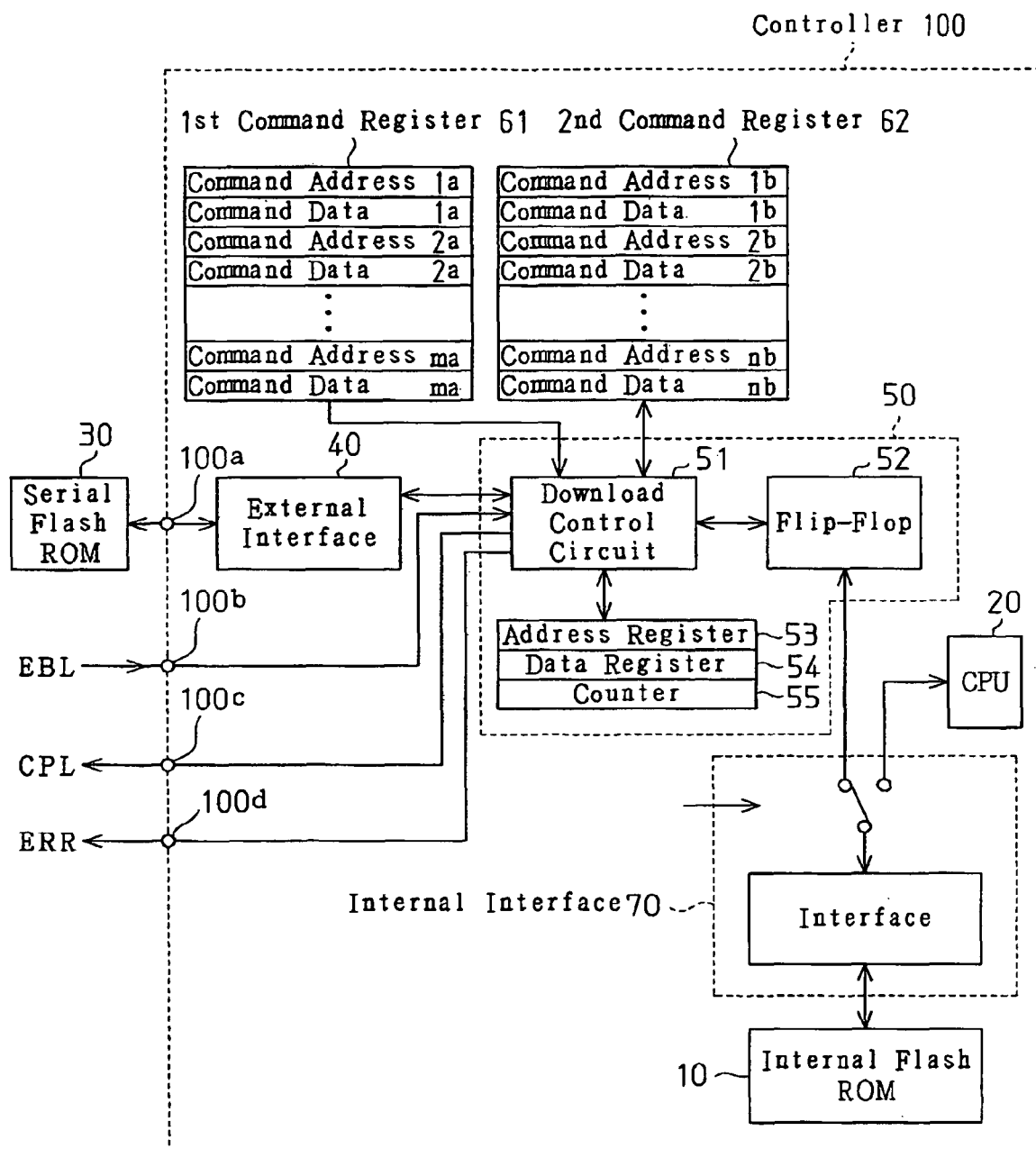
FIG. 1 is a block diagram of a controller according to a preferred embodiment of the present invention.

FIG. 1 is a block diagram of a controller 100 for a peripheral device, such as a CD-ROM drive. The controller 100 includes an internal flash ROM 10, which serves as an electrically rewritable internal nonvolatile memory, a microcomputer (CPU) 20, an external interface 40, a download circuit 50, a first command register 61, a second command register 62, and an internal interface 70. Immediately after the controller 100 is manufactured in a factory, the internal flash ROM 10 does not have any initial data (including an operation program and an update program for updating the operation program). Thus, the CPU 20 is incapable of performing any operation.

The writing (downloading) of initial data to the internal flash ROM 10 will now be described.

The external interface 40 of the controller 100 is connected to an external serial flash ROM 30, which serves as an external nonvolatile memory. When the controller 100 downloads the initial data stored in the external serial flash ROM 30, a download enable signal EBL is transmitted to the download circuit 50 via an external terminal 100b. In response to the download enable signal EBL, the download circuit 50 generates a control signal that causes the CPU 20 to enter a sleep mode, and the internal interface 70 disconnects the CPU 20 from the internal flash ROM 10. This enables the download circuit 50 to sequentially write predetermined data to predetermined addresses of the internal flash ROM 10 without being interrupted by the operation of the CPU 20.

Afterwards, the download circuit 50 reads one piece of the data stored in the external serial flash ROM 30 via the external interface 40 in predetermined address units. The download circuit 50 then writes the read one piece of the data to the internal flash ROM 10 via the internal interface 70. Accordingly, the download circuit 50 alternately performs reading and writing of pieces of the data to download the data stored in the external serial flash ROM 30 to the internal flash ROM 10. By repeating the reading and writing in this manner to the last address of the internal flash ROM 10, the data (operation program) is completely written to the internal flash ROM 10. After completing the writing, the download circuit 50 verifies the data that has been written to the internal flash ROM 10. After the verification, the download circuit 50 outputs a download completion signal CPL, which indicates that the writing has been completed, from an external terminal 100c. An external circuit receiving the download completion signal CPL, for example, illuminates an LED, to inform an operator that the writing (downloading) of the initial data to the internal flash ROM 10 has been completed.

The internal interface 70 connects the CPU 20 to the internal flash ROM 10, and the download circuit 50 cancels the sleep mode of the CPU 20. These two operations may be performed by the download circuit 50 immediately after the verification or may be performed by re-activating the controller 100 after the downloading is completed.

The writing of the initial data to the internal flash ROM 10 will now be described.

In the preferred embodiment, the first command register 61 is a nonvolatile memory. Further, the first command register 61 is formed by sets of registers pre-storing sets of commands for reading data from the external serial flash ROM 30. If the command sets for reading data from the external serial flash ROM 30 are unnecessary, the controller 100 does not have to include the first command register 61. Each command set is a set of commands that are necessary to access a flash memory. The command sets are transmitted to a flash memory in pairs of a command address and command data to have the flash memory perform a predetermined operation, such as erasing, writing, and reading of data. The contents of the command sets differ depending on the specifications of the flash memory.

The second command register 62 is a set of registers storing sets of commands for writing data to the internal flash ROM 10 and sets of commands for reading data from the internal flash ROM 10. In the preferred embodiment, the second command register 62 may either be a nonvolatile memory or a volatile memory. When the second command register 62 is a volatile memory, the second command register 62 may store command sets read from a predetermined address area of the external serial flash ROM 30. The predetermined address area of the external serial flash ROM 30 pre-stores the command sets for the internal flash ROM 10.

The download circuit 50 includes a download control circuit 51, a flip-flop 52, an address register 53, a data register 54, and a counter 55.

The download control circuit 51 is connected to the address register 53, the data register 54, and the counter 55. The download control circuit 51 is also connected to the internal interface 70 via the flip-flop 52. The flip-flop 52 holds a plurality of signals transferred between the download control circuit 51 and the internal flash ROM 10.

The address register 53 stores the address at which the external serial flash ROM 30 or the internal flash ROM 10 is to be accessed. The data register 54 stores data read from the external serial flash ROM 30 at the address stored in the address register 53. The counter 55 counts the number of cycles (the pulses of a clock signal) necessary for writing data to the internal flash ROM 10. The counter 55 counts the number the clock signal pulses until the count value of the counter 55 reaches a set count value (number of cycles). The set count value is determined in accordance with the electric characteristic of the internal flash ROM 10 and the frequency of the clock signal. The set count value may be pre-stored in a nonvolatile memory of the counter 55 or be read from a predetermined address area of the external serial flash ROM 30 and stored in a volatile memory.

When the internal flash ROM 10 is accessed, the accessing must be performed in intervals of a predetermined time, which is determined in accordance with a setup time and a hold time. For example, when data is sequentially written to the internal flash ROM 10, a predetermined wait time is required from when one piece of data is written to when the next piece of data is written. The length of the wait time depends on the electric characteristic of the internal flash ROM 10.

The download control circuit 51 uses the clock signal to measure this wait time. More specifically, the download control circuit 51 measures a predetermined time (wait time) based on the number of pulses of the clock signal, which is counted by the counter 55. The frequency of the clock signal differs depending on the peripheral device for which the controller 100 is used. The download control circuit 51 waits until the count value of the counter 55 reaches the set count value, which is determined in accordance with the electric characteristic of the internal flash ROM 10 and the frequency of the clock signal, before accessing the internal flash ROM 10 to write the next piece of data.

Figure 2:
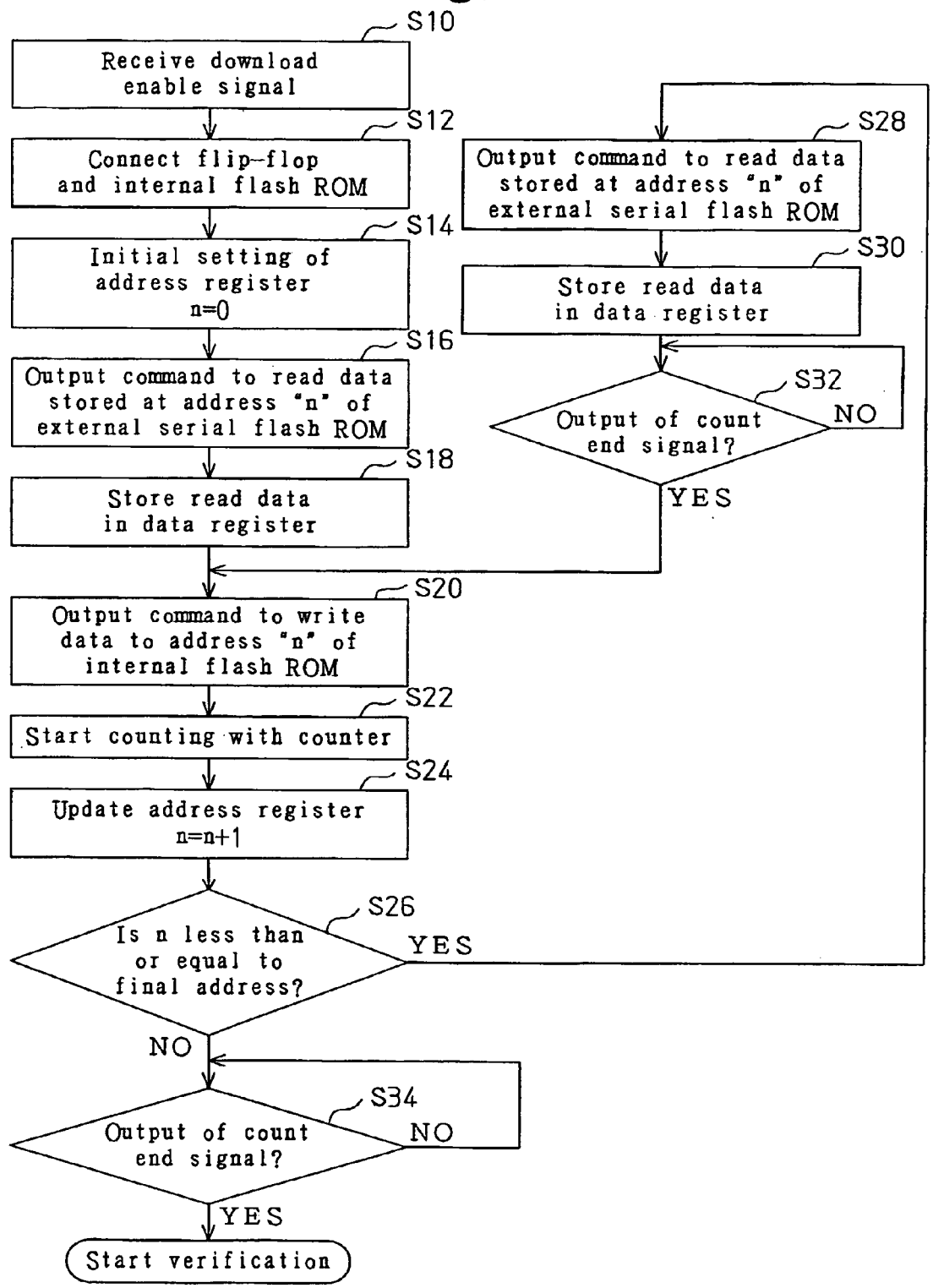
FIGS. 2 and 3 are flowcharts showing a process for writing initial data according to a preferred embodiment of the present invention.

The writing of the initial data to the internal flash ROM 10 will now be described with reference to FIGS. 2 and 3.

First, in step S10, the download control circuit 51 is provided with the download enable signal EBL. In response to the download enable signal EBL, the download control circuit 51 generates a control signal for having the CPU 20 enter the sleep mode. In step S12, the internal interface 70 disconnects the CPU 20 from the internal flash ROM 10 and connects the internal flash ROM 10 to the flip-flop 52. In step S14, the download control circuit 51 sets, in the address register 53, the address (e.g., "0") at which the external serial flash ROM 30 is to be accessed first. In step S16, the download control circuit 51 sequentially reads data read command sets from the first command register 61. Then, the download control circuit 51 sequentially provides the external serial flash ROM 30 with the command sets that have been read and the address that is registered in the address register 53 via the external interface 40. This causes the external serial flash ROM 30 to output data stored at the input address. In step S18, the data output from the external serial flash ROM 30 is read by the download control circuit 51 via the external interface 40 and temporarily stored into the data register 54.

In step S20, the download control circuit 51 sequentially reads data write command sets from the second command register 62. Then, the download control circuit 51 sequentially provides the command sets that have been read, the address that is registered in the address register 53, and the data that is temporarily stored in the data register 54 to the internal flash ROM 10 via the flip-flop 52 and the internal interface 70. The flip-flop 52 maintains the operation for writing data to the internal flash ROM 10. This enables the download control circuit 51 to perform a different operation while the flip-flop 52 is writing data to the internal flash ROM 10.

In step S22, the download control circuit 51 controls the counter 55 to start counting when the above-described command set, address, and data are provided to the flip-flop 52. The counter 55 is, for example, an increment counter. The counter 55 counts the number of pulses of a reference clock signal (not shown). When the count value of the counter 55 reaches the set count value of the download control circuit 51, the counter 55 provides the download control circuit 51 with a count end signal having a predetermined level. This resets the count value of the counter 55. When receiving the count end signal having the predetermined level, the download control circuit 51 determines that the next accessing of the internal flash ROM 10 has been enabled.

The download control circuit 51 starts counting with the counter 55. In step S24, the download control circuit 51 updates the address that is registered in the address register 53 (e.g., increments the address), and sets, in the address register 53, the address at which the external serial flash ROM 30 is to be accessed next. In step S26, the download control circuit 51 determines whether the address that is registered in the address register 53 is less than or equal to a set final address value of the internal flash ROM 10. The set final address value may be pre-stored in a nonvolatile memory of the download control circuit 51 or may be read from a predetermined address area of the external serial flash ROM 30 and stored in a volatile memory.

When the address that is registered in the address register 53 is less than or equal to the set final address value of the internal flash ROM 10 (YES in step S26), the download control circuit 51 sequentially reads data read command sets from the first command register 61 and sequentially outputs the read command sets and the address that is registered in the address register 53 to the external serial flash ROM 30 via the external interface 40 in step S28. This causes the external serial flash ROM 30 to output data stored at the input address. In step S30, the download control circuit 51 reads the data output from the external serial flash ROM 30 via the external interface 40 and temporarily stores the data in the data register 54.

In step S32, the download control circuit 51 waits until the counter 55 outputs a count end signal. When the counter 55 outputs the count end signal (YES in step S32), the download control circuit 51 sequentially reads data write command sets from the second command register 62 and sequentially provides the internal flash ROM 10 with the command set that have been read, the address that is registered in the address register 53, and the data that is temporarily stored in the data register 54 via the flip-flop 52 and the internal interface 70 in step S20.

Subsequently, during the period in which the address that is registered in the address register 53 is less than or equal to the set final address value of the internal flash ROM 10, steps S20 to S32 are repeated. When the address that is registered in the address register 53 exceeds the set final address value of the internal flash ROM 10 (NO in step S26), the download control circuit 51 waits until the counter 55 outputs a count end signal (S34). When the counter 55 outputs the count end signal (YES in step S34), the download control circuit 51 starts verification.

When the command sets in the second command register 62, the set count value, and the set final address value are to be stored in a volatile memory, such information is read from predetermined addresses of the serial flash ROM 30 (e.g., from an address area having values greater than the final address of the internal flash ROM 10) and stored in the volatile memory after step S10. Step S12 may be performed afterwards.

Figure 3:
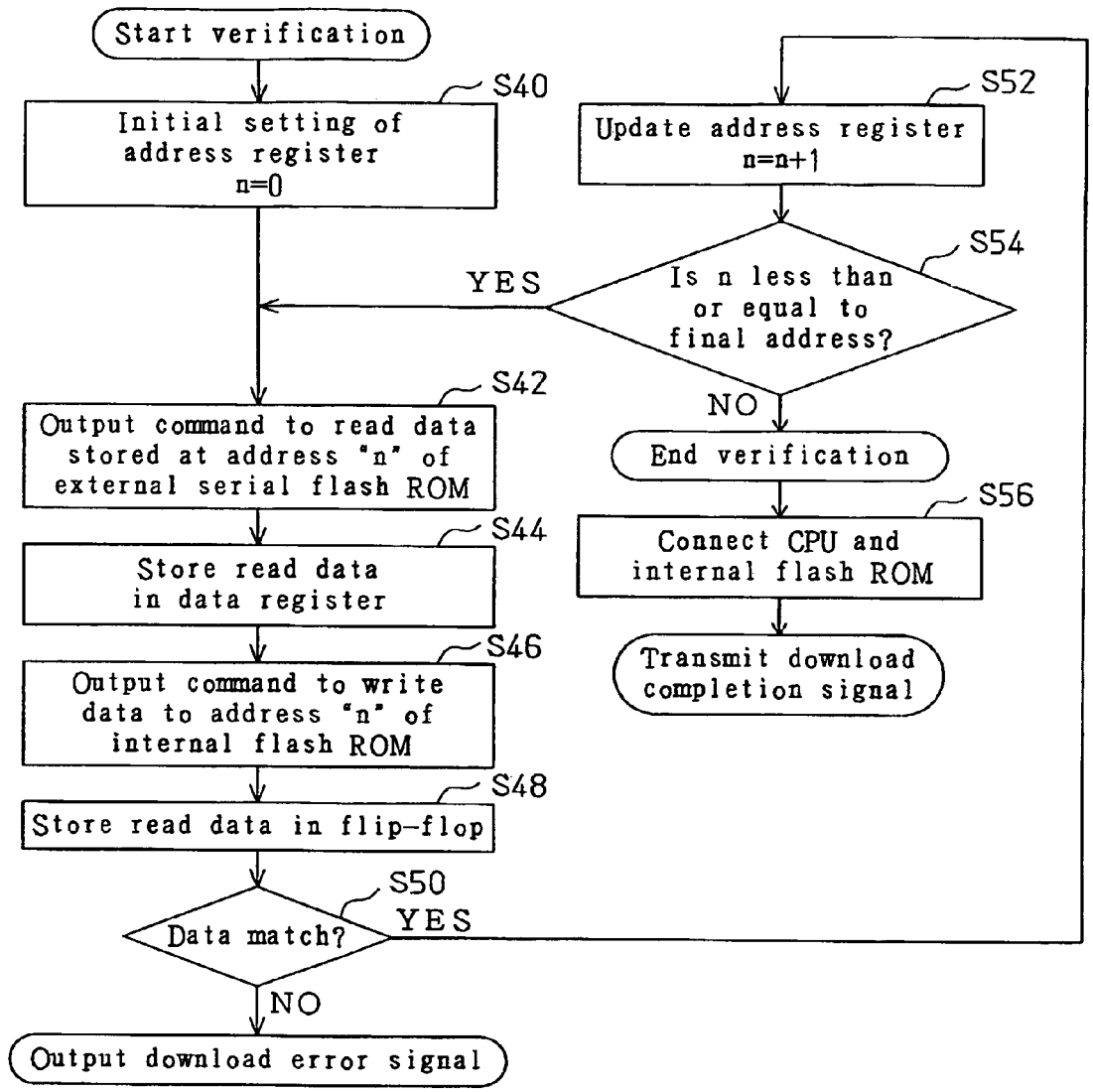

In step S40 of FIG. 3, the download control circuit 51 first sets, in the address register 53, the address at which the external serial flash ROM 30 is to be accessed first (e.g., "0"). In step S42, the download control circuit 51 sequentially reads data read command sets from the first command register 61 and sequentially outputs the command sets that have been read and the address that is registered in the address register 53 to the external serial flash ROM 30 via the external interface 40. This causes the external serial flash ROM 30 to output data stored at the input address. In step S44, the download control circuit 51 reads the data output from the external serial flash ROM 30 via the external interface 40 and temporarily stores the data in the data register 54.

In step S46, the download control circuit 51 sequentially reads the data read commands from the second command register 62 and sequentially outputs the command sets that have been read and the address that is registered in the address register 53 to the internal flash ROM 10 via the flip-flop 52 and the internal interface 70. This causes the internal flash ROM 10 to output data stored at the input address. In step S48, the data output from the internal flash ROM 10 is read by the flip-flop 52 via the internal interface 70.

In step S50, the download control circuit 51 compares the data stored in the flip-flop 52 and the data stored in the data register 54. When the data stored in the flip-flop 52 and the data stored in the data register 54 do not match (NO in step S50), the download control circuit 51 outputs a download error signal ERR.

When the data stored in the flip-flop 52 and the data stored in the data register 54 match (YES in step S50), the download control circuit 51 updates the address that is registered in the address register 53 (e.g., increments the address), and sets, in the address register 53, the address at which the external serial flash ROM 30 is to be accessed next in step S52. In step S54, the download control circuit 51 determines whether the address that is registered in the address register 53 is less than or equal to the set final address value of the internal flash ROM 10. When the address that is registered in the address register 53 is less than or equal to the set final address value (YES in step S54), the processing returns to step S42, and steps S42 to S54 are repeated. When the address that is registered in the address register 53 is greater than the set final address value (NO in step S54), the download control circuit 51 ends the verification.

After the verification, the internal interface 70 connects the CPU 20 to the internal flash ROM 10, and the download circuit 50 has the CPU 20 exit the sleep mode in step S56. Then, the download circuit 50 externally transmits a download completion signal CPL indicating that the writing has been completed via the external terminal 100c.

In this manner, two types of programs, namely, the operation program, which is used by the CPU 20 to control each circuit of the peripheral device, and the update program, which is used by the CPU 20 to update the operation program, are written to the internal flash ROM 10. The CPU 20 reads the operation program from the internal flash ROM 10 via the internal interface 70 and controls each circuit in accordance with the read operation program. For example, when the peripheral device is a CD-ROM drive, the CPU 20 moves a pickup, which radiates an optical disc with a laser beam, to a predetermined position on the optical disc and reads the data stored in the optical disc from the reflection of the laser beam. When the operation program requires updating, the CPU 20 rewrites the operation program in accordance with the update program.

The preferred embodiment has the advantages described below.

(1) The download circuit 50, which functions to download data, copies the initial data stored in the external serial flash ROM 30 to the internal flash ROM 10 without using the CPU 20. Thus, the speed for downloading data is high. Further, a mask ROM for storing the update program, which is used to write the operation program, is unnecessary. The elimination of such a mask ROM prevents circuit area enlargement of the controller 100. The controller 100 is only required to store the command sets necessary to access the internal flash ROM 10 and the external serial flash ROM 30. The operation of preparing the internal flash ROM 10 and writing the initial data to the internal flash ROM 10 before mounting the internal flash ROM 10 on the printed circuit board of the controller 100 is unnecessary. This prevents the manufacturing cost of the controller 100 from increasing.

(2) The download circuit 50, which functions to download data, copies the initial data stored in the external serial flash ROM 30 to the internal flash ROM 10. Thus, an external host computer for providing the initial data is unnecessary when writing the initial data to the internal flash ROM 10.

(3) The download circuit 50 includes the flip-flop 52, which maintains the operation for writing data to the internal flash ROM 10, and the counter 55, which manages the writing time. This enables the next piece of data that is to be written to the internal flash ROM 10 to be read from the external serial flash ROM 30 when one piece of data is being written to the internal flash ROM 10. Thus, the time required for downloading is shortened.

(4) The internal flash ROM 10 does not need to store the initial data (including the operation program and the update program) when the controller 100 is manufactured. Thus, the internal flash ROM 10 may be integrated, for example, together with the controller 100. This reduces the circuit area of the entire peripheral device.

It should be apparent to those skilled in the art that the present invention may be embodied in many other specific forms without departing from the spirit or scope of the invention. Particularly, it should be understood that the present invention may be embodied in the following forms.

The external serial flash ROM 30 is not limited to a serial memory and may be a memory having a plurality of address terminals and a plurality of data terminals.

The counter 55 does not have to be used to manage the required data writing time for each address whenever data is written to the internal flash ROM 10. For example, the download control circuit 51 may transmit the next piece of data to the internal flash ROM 10 after waiting for the time required for data writing. Alternatively, the download control circuit 51 may detect the completion of the writing of data to the internal flash ROM 10 from a toggle bit or through polling.

In the preferred embodiment, the initial data to be downloaded to the internal flash ROM 10 is read from the external serial flash ROM 30. Thus, the number of the external terminals 100a, 100b, 100c, and 100d required by the controller 100 for downloading data may be reduced. For example, at least one of or all of the external terminals 100a, 100b, 100c, and 100d used for downloading data may be commonly used as at least one normal terminal, which are used in operations other than the downloading operation. The normal terminals are used in normal operations to exchange signals with an external circuit. This prevents an increase in the total number of external terminals and normal terminals of the controller 100. Further, the controller 100 may supply the external serial flash ROM 30 with power via a power supply terminal, for example, via the external terminal 100a. In this case, simple engagement of the external serial flash ROM 30 with the external interface 40 and transmission of the download enable signal EBL enables the downloading of data.

In the preferred embodiment, data is read from the external serial flash ROM 30 in single address units, and the single address unit of data is written to the internal flash ROM 10. However, data may be read from the external serial flash ROM 30 in predetermined plural address units, and the plural address unit data may be written to the internal flash ROM 10, for example, in a burst mode. In this case, the data register 54 stores plural pieces of data corresponding to plural addresses, and the download control circuit 51 outputs, to the flip-flop, sets of commands that are in accordance with the burst mode.

In the preferred embodiment, the internal flash ROM 10 is the electrically rewritable nonvolatile memory for storing the operation program, which is used by the microcomputer (CPU 20) to execute a predetermined operation control. However, a programmable read-only memory (PROM), which is rewritable, may be used instead of the internal flash ROM 10.

In the preferred embodiment, the controller 100 may be an integrated circuit, in which the internal flash ROM 10 is integrated, or a multichip package, in which a plurality of semiconductor chips are integrated during packaging.

In the preferred embodiment, the peripheral device is not limited to a CD-ROM drive, but may be any device that may be connected to a computer to exchange data with the computer. For example, the peripheral device may be a drive for optical discs such as an MD or a DVD-RAM, a drive for magneto-optical discs, or a drive for magnetic disks such as a hard disk. Further, the peripheral device is not limited to an information storage device and may be an output device such as a printer, a reading device such as a scanner, or a communication device such as a modem or a LAN.

The present examples and embodiments are to be considered as illustrative and not restrictive, and the invention is not to be limited to the details given herein, but may be modified within the scope and equivalence of the appended claims.

What is claimed is:

1. A controller connectable to an external memory, the controller comprising:
    a microcomputer provided with a sleep mode;
    an electrically rewritable internal nonvolatile memory for storing an operation program executed by the microcomputer to control a predetermined operation;
    an internal interface for controlling input to the internal nonvolatile memory and output from the internal nonvolatile memory;
    an external interface for controlling input to the external memory and output from the external memory;
    a download circuit connected between the external interface and the internal interface, for alternately reading data of an operation program stored in the external memory in a predetermined address unit via the external interface and writing the read data of the operation program to the internal nonvolatile memory in the predetermined address unit via the internal interface, in accordance with an external signal; and
    a package configured to integrate the microcomputer, the electrically rewritable internal nonvolatile memory, the internal interface, the external interface and the download circuit, the package configured to receive the external signal supplied from outside the package,
    wherein in response to the external signal, the download circuit generates a control signal
        that causes the microcomputer of the package to enter the sleep mode and
        after causing the microcomputer to enter the sleep mode, that causes the internal interface to disconnect the microcomputer of the package from the internal nonvolatile memory, and the download circuit has the microcomputer exit the sleep mode after writing the read data of the operation program to the internal nonvolatile memory.

2. The controller according to claim 1, wherein the download circuit includes:
    a flip-flop for maintaining a state in which the data is being written to the internal nonvolatile memory; and
    a counter for measuring a writing time during which the data is being written to the internal nonvolatile memory.

3. The controller according to claim 1, further comprising:
    a nonvolatile first command register storing a set of commands for reading the data stored in the external memory.

4. The controller according to claim 1, further comprising:
    a second command register storing a set of commands for writing the data to the internal nonvolatile memory.

5. The controller according to claim 1, further comprising:
    an external terminal for connecting the external memory to the external interface, wherein the external terminal is commonly used as a normal terminal that is used by the controller to exchange a signal with an external circuit when the download circuit is not operating.

6. The controller according to claim 5, further comprising:
    a power supply terminal for supplying power to the external memory.

7. The controller according to claim 5, wherein the external memory is a serial memory.

8. The controller according to claim 1, wherein the controller is incorporated in a peripheral device to control an operation of the peripheral device in accordance with the operation program, the data including a program for updating the operation program.

9. The controller according to claim 8, wherein the data includes the operation program.

10. The controller according to claim 1, wherein the microcomputer exits the sleep mode and the internal interface connects the microcomputer to the internal nonvolatile memory except when the download circuit is writing the data.

11. A controller connectable to an external memory, the controller comprising:
    a microcomputer provided with a sleep mode;
    an electrically rewritable internal nonvolatile memory for storing an operation program of the microcomputer;
    an internal interface connected between the internal nonvolatile memory and the microcomputer;
    an external interface to which the external memory is connected;
    a download circuit connected between the external interface and the internal interface for downloading data of an operation program stored in the external memory in accordance with an external signal, wherein said downloading is performed by repeating alternately reading the data of the operation program from the external memory in address units and writing the read data of the operation program to the internal nonvolatile memory in the address units; and
    a package configured to integrate the microcomputer, the electrically rewritable internal nonvolatile memory, the internal interface, the external interface and the download circuit,
    wherein
    the microcomputer of the package is continuously in the sleep mode and
    the internal interface continuously disconnects the microcomputer of the package from the internal nonvolatile memory in response to an external signal supplied from outside the package to the package, and
    the download circuit has the microcomputer exit the sleep mode after writing the read data of the operation program to the internal nonvolatile memory.

12. The controller according to claim 1,
    wherein the download circuit is programmed to execute a downloading sequence including the generating the control signal that causes the microcomputer of the package to enter the sleep mode and the internal interface to disconnect the microcomputer of the package from the internal nonvolatile memory and the exiting the microcomputer from the sleep mode, and
    wherein the external signal is a download enable signal that triggers the downloading sequence of the download circuit.

* * * * *